Dec. 26, 1939.  C. A. BARRETT  2,184,860

HANGER CONSTRUCTION

Original Filed March 5, 1937

INVENTOR.
CLARENCE A. BARRETT
BY
ATTORNEY.

Patented Dec. 26, 1939

2,184,860

UNITED STATES PATENT OFFICE 2,184,860

HANGER CONSTRUCTION

Clarence A. Barrett, Detroit, Mich., assignor, by mesne assignments, to Trolley Conveyors Development Foundation Inc., a corporation of Michigan Application March 5, 1937, Serial No. 129,170
Renewed October 9, 1939

7 Claims. (Cl. 105—155)

This invention relates to trolley conveyors of the type wherein trolleys are mounted on overhead tracks at spaced intervals and connected together by a common chain which drives the trolleys as well as articles suspended from the chain and/or trolleys and has for its object to provide an improved conveyor of longer life and more economical construction, which will operate through a shorter turning radius and which will not surge during operation.

An object of this invention is to provide a novel conveyor which will be capable of efficiently using a known type of chain of economical construction in combination with a novel and improved type of trolley with parts of the trolley replacing parts of the chain in such manner as to become an integral part thereof without disturbing the rhythm of the chain assembly, the trolley being adapted to directly support vertical loading and being likewise a part of the chain without a necessary increase of clearances between chain links at the point of connection.

Another object is to provide a trolley comprising a head portion and depending legs with the legs securing the several functions of guiding the head, transmitting loading thereto, maintaining the chain in proper operating relation therewith and at the same time, guarding the head and track against relative binding.

A specific object is to provide a trolley with two sets of rollers, one of the roller sets sustaining all vertical loading while the other set acts to guard the head against frictional sliding against the track.

Another specific object is to provide a trolley comprising a roller supported head and depending legs or trolley bars with the lower ends of the bars constituting chain link pins, and spacers separating the links from the head. The spacers are free and constitute rollers for guiding contact with the supporting track or not, depending on the relative width of the trolley head.

Another object is to provide a trolley comprising rollers without directional axles and capable of small lateral and horizontal rotational movements with respect to its tracks whereby it may function with a minimum of wear.

Another object is to provide an improved trolley, chain and track combination such that a chain flexible for lateral movements but substantially stiff vertically may be subjected to substantial vertical inclination.

Other objects and advantages will hereinafter become more apparent as reference is had to the accompanying drawing wherein:—

Figure 1:
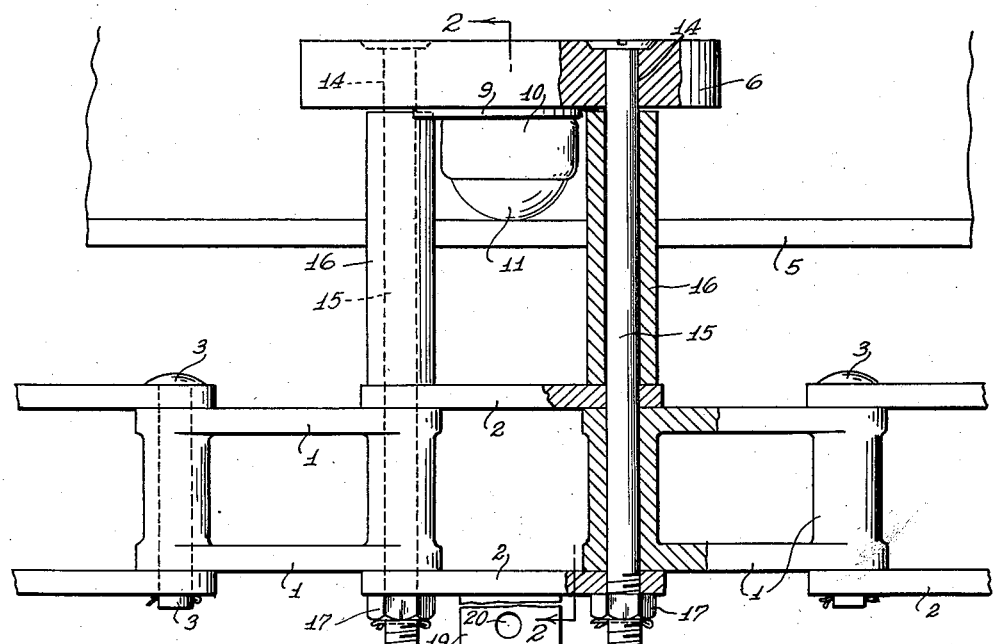
Figure 2:
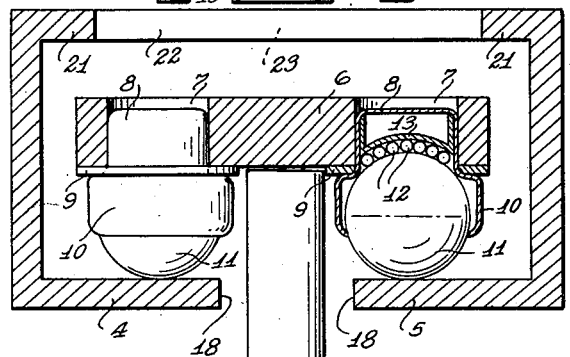
Figure 3:
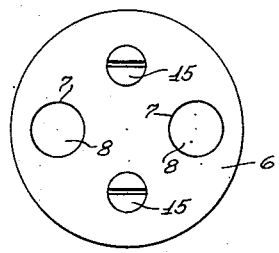

Fig. 1 is a side elevation of my improved track and trolley with the trolley partially broken away and the near track section removed, Fig. 2 is a transverse section taken along the line 2—2 of Fig. 1, and Fig. 3 is a top plan view of the trolley.

More particularly 1 indicates integral links and 2 indicates link pieces which are attached to the links 1 by pins 3 to constitute a conveyor chain. The chain is driven by a motor and sprocket wheels (not shown) and is suspended from a divided track 4, 5 by a series of trolleys, one of which is illustrated herewith.

The trolley consists of a head, supporting rollers and load supporting means, the head 6 being suitably made in the form of a metallic disc having two openings 7 therethrough oppositely spaced from the center of the disc laterally of the intended direction of travel. In each of these openings a caster casing 8 is inserted from the lower side of the disc. Each caster casing has a flange 9 contacting the disc 6 and welded thereto and the lower portion 10 of the casing is enlarged to receive a ball roller 11. This lower portion 10 extends below the center of the roller 11, being converged to retain the roller therein. The rollers each seat in a group of small balls 12 which, in turn, are seated in a cup 13. The rollers 11 have no fixed axis of rotation but may roll freely in any direction, one of the rollers running along a track section 4 and the other running along the parallel section 5. The caster portions 10 not only serve to retain the rollers in position but also serve as hoods therefor.

The head 6 has two countersunk additional openings 14 therethrough oppositely spaced from the head center and lying longitudinally along the intended direction of trolley travel. Through each of these openings an elongated trolley bar 15 extends. These bars are spaced from each other by the distance between pin openings of the chain, links 2 and the lower portions of the trolley bars replace two pins 3 to constitute a part of the chain. Between the top link 2 and the head 6 spacers 16 are interposed and nuts 17 maintain the assembly.

The spacers 16 have an internal diameter such that they fit loosely on the bars 15 and the nuts 17 are threaded onto the bars by an amount such that the spacers do not tightly contact the head. The spacers are therefore rotatable on their bars and serve as guides for the trolley when contacting the surfaces 18 of the track sections 4 and 5.

The lower link 2 which rests on the nuts 17 has depending ears 19 through which openings 20 extend to receive articles or hooks for articles to be carried by the conveyor.

The track sections 4 and 5 are of L-shaped angle irons with the angles facing each other. Extending toward each other from the top of the sections are flanges 21, the distance between which is less than the width of the top 6. When the conveyor direction is angularly upward one or more of the trolleys may be elevated with respect to its track sections and the flanges 21 serve as means for limiting the relative elevation of a head 6. The spacing between the rails 4 and 5 is such that the chain links 1 and 2 may pass therebetween. The sections 4 and 5 are connected at intervals by straps 22 each having an opening 23 therethrough for attachment to a ceiling or other track support.

What I claim is:—

1. A trolley for a chain conveyor comprising cylindrical hangers, universally mounted rollers for supporting said hangers from a track, a chain comprising links having openings through which said hangers extend, and separate guide means comprising two spaced rollers journalled on said hangers having vertical axes for guiding contact with said track, said rollers serving also to position said links on said hangers.

2. A trolley for a chain conveyor comprising a head having a center, supporting rollers oppositely offset from said center laterally of the intended direction of travel and two trolley bars oppositely offset from said center longitudinally along the intended direction of travel depending from said head, each of said trolley bars having a tubular member therearound capable of rotation with respect thereto.

3. In combination, a trolley comprising spaced trolley bars, a head having rollers for supporting said bars from a track structure, a chain comprising links having openings therethrough and link pins extending through said openings, the lower part of each of said bars extending through an opening in separate links in replacement of two of said pins whereby the trolley becomes a part of said chain, spacers between said head and said links, and means maintaining said links and said spacers in loose fitting assembly on said bars.

4. In combination, a trolley comprising spaced trolley bars, a head having rollers for supporting said bars from a track structure, a chain comprising links having openings therethrough and link pins extending through said openings, the lower part of each of said bars extending through an opening in separate links in replacement of two of said pins whereby the trolley becomes a part of said chain, spacers between said head and said links, means maintaining said links and said spacers in loose fitting assembly on said bars, a link piece bridging said bars below said links, and article carrying means fixedly secured to said link piece.

5. In combination, a longitudinally split track, a trolley for said track comprising rollers, a trolley head surmounting said rollers and operatively connected thereto, parallel hangers depending from said head through said split track, a conveyor chain comprising links joined by link pins, the lower part of each of said hangers being adapted to replace two adjacent link pins thereby becoming a part of said chain, and spacers between said head and the links to which said hangers are directly connected.

6. In combination, a longitudinally split track, a trolley for said track comprising rollers, a trolley head surmounting said rollers and operatively connected thereto, parallel hangers depending from said head through said split track, a conveyor chain comprising links joined by link pins, the lower part of each of said hangers being adapted to replace two adjacent link pins thereby becoming a part of said chain, and spacers between said head and the links to which said hangers are directly connected, said spacers being tubular collars rotatable on said hangers upon contact with either side of said track.

7. A trolley for a chain conveyor comprising spaced parallel hangers for projection through the opening in a split track, universally mounted rollers supporting said hangers from said track, a chain comprising links having openings through which said hangers extend, sleeves surrounding and rotatable on said hangers constituting guide means for said rollers and positioning means for the links of said chain.

CLARENCE A. BARRETT.